Nov. 12, 1935. O. THIEME 2,020,340
COMBINED TYPEWRITING AND COMPUTING MACHINE
Filed July 15, 1930 4 Sheets-Sheet 1
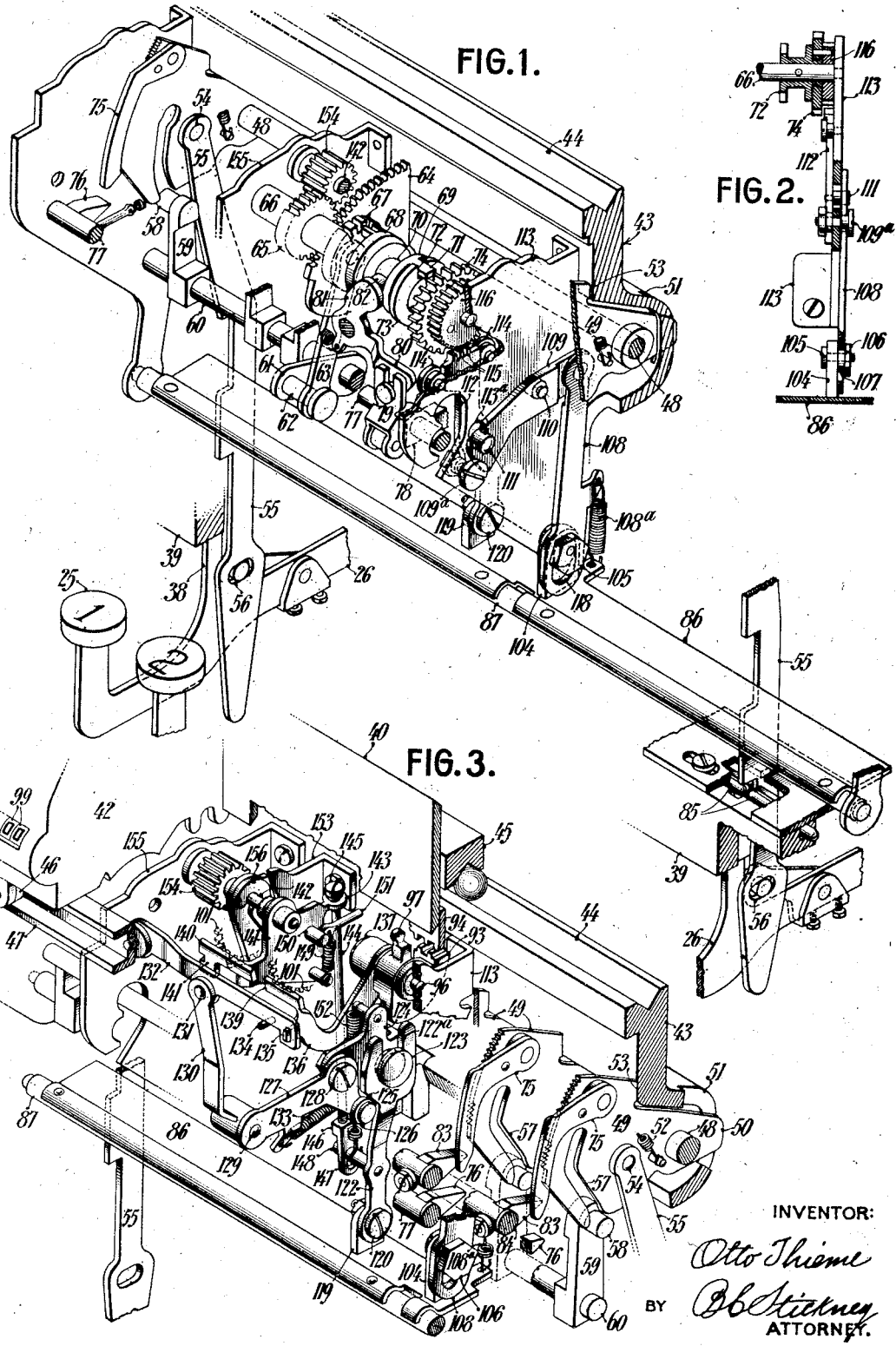
INVENTOR:
Otto Thieme
BY D. B. Stickney
ATTORNEY.

Nov. 12, 1935.    O. THIEME    2,020,340
COMBINED TYPEWRITING AND COMPUTING MACHINE
Filed July 15, 1930    4 Sheets-Sheet 2
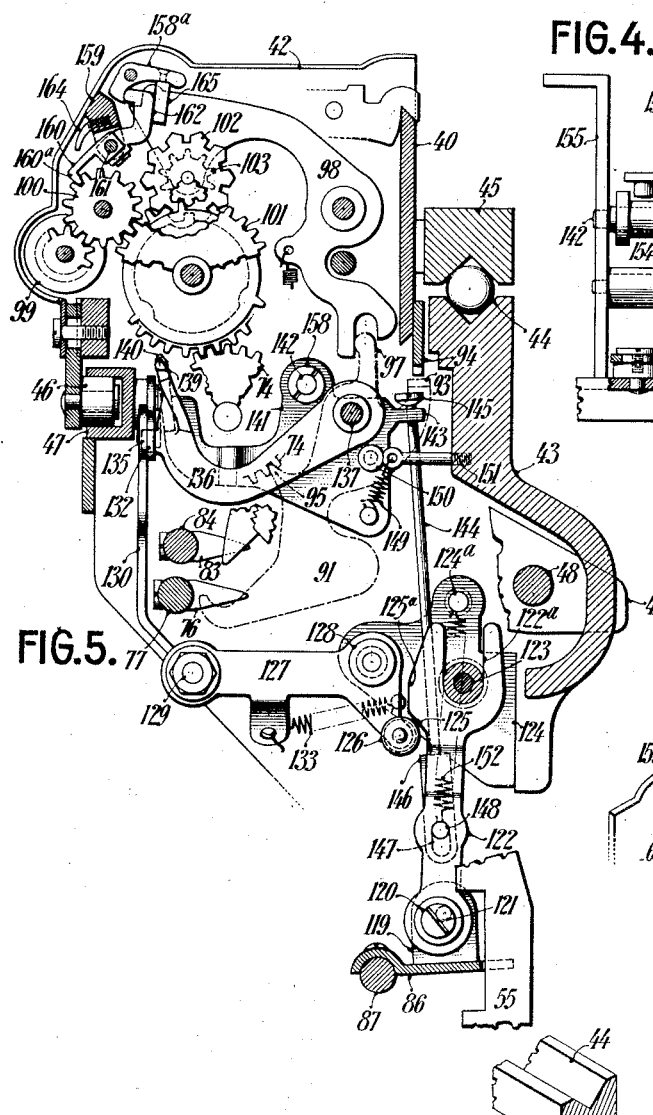
INVENTOR:
Otto Thieme
BY D. C. Stickney
ATTORNEY.

Nov. 12, 1935. O. THIEME 2,020,340
COMBINED TYPEWRITING AND COMPUTING MACHINE
Filed July 15, 1930 4 Sheets-Sheet 3
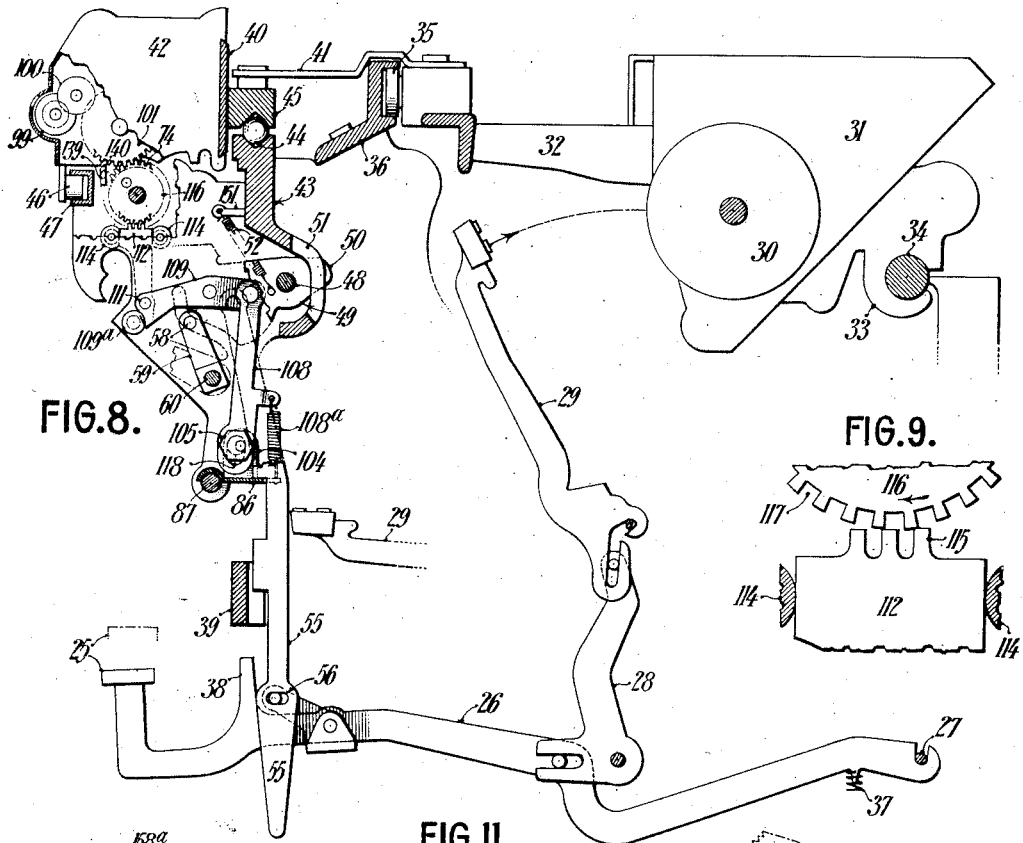
INVENTOR:
Otto Thieme
BY D.C. Stickney
ATTORNEY.

Nov. 12, 1935.     O. THIEME     2,020,340
COMBINED TYPEWRITING AND COMPUTING MACHINE
Filed July 15, 1930     4 Sheets-Sheet 4
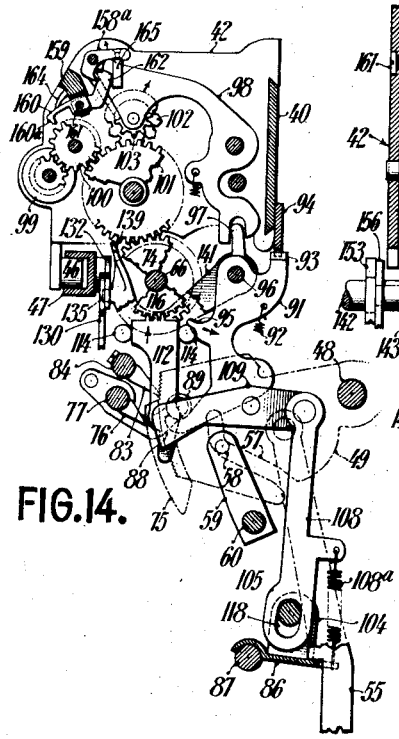
FIG. 14.
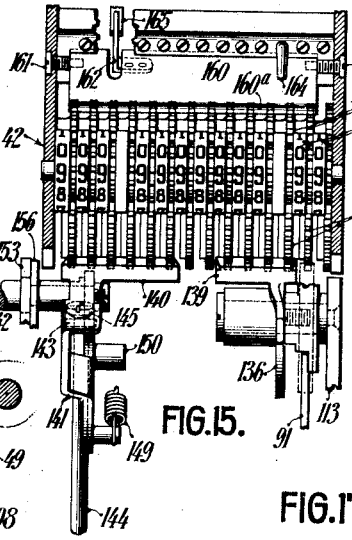
FIG. 15.
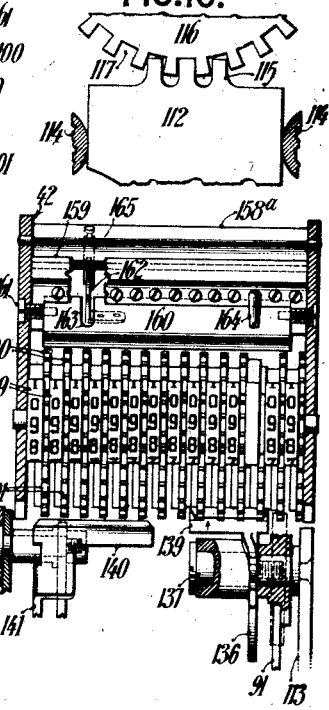
FIG. 16.
FIG. 17.
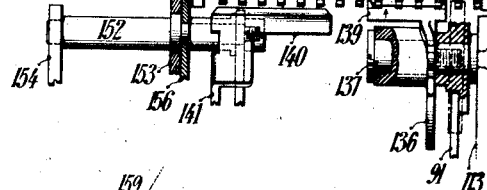
FIG. 20.     FIG. 19.     FIG. 18.
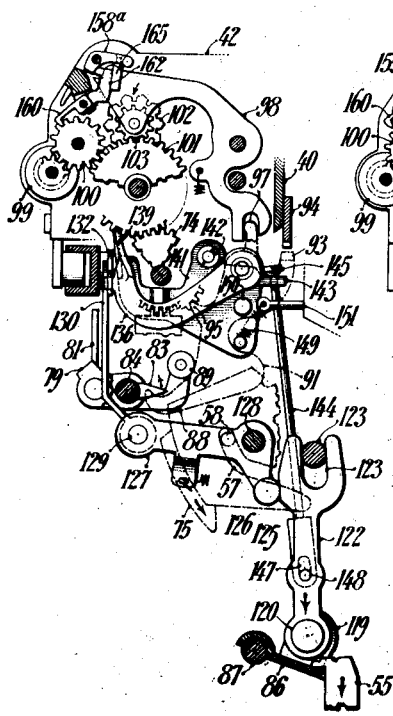
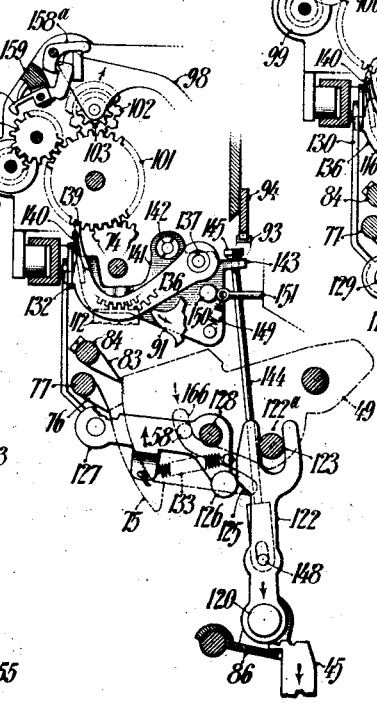
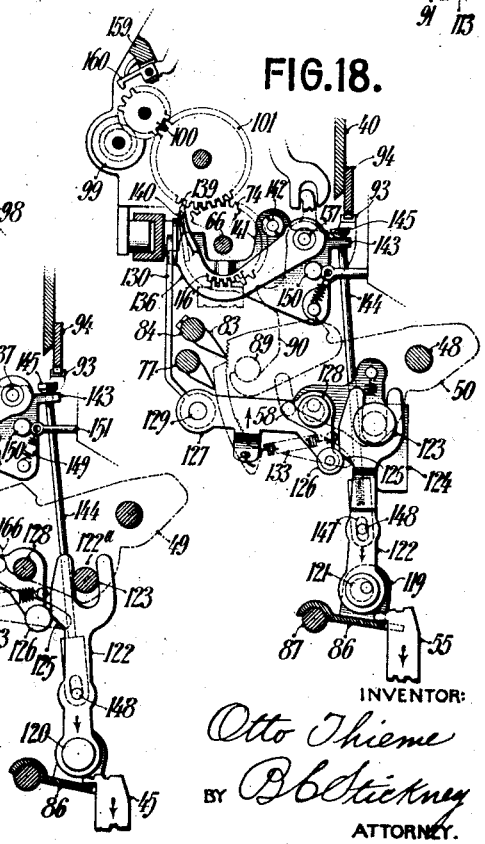
INVENTOR:
Otto Thieme
BY B. L. Stickney
ATTORNEY.

Patented Nov. 12, 1935

2,020,340

UNITED STATES PATENT OFFICE 2,020,340

COMBINED TYPEWRITING AND COMPUTING MACHINE

Otto Thieme, Hartford, Conn., assignor, by mesne assignments, to Underwood Elliott Fisher Company, New York, N. Y., a corporation of Delaware Application July 15, 1930, Serial No. 468,175

16 Claims. (Cl. 235—59)

This invention relates to improvements in combined typewriting and computing machines, and more particularly to the tooth-aligning means for aligning the numeral-wheels of a totalizer after the printing and accumulation of each digit.

The development of machines of this character requires a progressive enlargement of the denominational scope of the totalizers to accumulate larger amounts to keep pace with the increase in business volume. A few years ago a seven-wheel totalizer was sufficient to handle most typing accounts, and with the steady addition of numeral-wheel trains for the totalizer to compute records running into nine, twelve and even more denominations, many of the co-operative parts that were operative in a seven-wheel combination became defective by this increase in the number of denomination trains. This is particularly true of the aligning means to remove spirality from the numeral-wheels of the totalizer, an operation absolutely essential to the accurate accumulation of digital values, and which the mere elongation of certain parts will not remove.

One feature of the present invention includes the splitting of the totalizer-wheel-aligning bar into two sections, one section for a predetermined number of wheels of lower denominations, and another section for the remaining wheels of the series. In thus cutting the scope of the aligning bar within effective limits and providing a separate and distinct operation for the aligning sections, the alignment of one section may progressively follow a previous section and not operate in unison, and the number of digit-wheels that may be assembled in a totalizer is practically unlimited. A nine-wheel totalizer will immediately respond for a straight-line register-reading of the numerals and without adding to the burden of the numeral-key manipulations.

Furthermore the aligning is not confined to the aligning elements of the totalizer, but the alignment may begin at the instant the master gear has completed its rotary transmission of digital power, and at the end of the key-stroke a third and final refining aligner may be released to operate very close to the numeral-wheels to correct any variations in the prior alignments due to a working looseness required for the free operation of the trains of gears. With such a combination of co-operative, widely-spaced-apart aligning elements in the trains of gears that first closely align the gears, and then minutely realign the numeral-wheels, all working slack is removed from the trains and a theoretical transmission of the parts without backlash is accomplished.

Another feature includes the rearrangement of the full-stroke mechanism by the substitution of flexible back-checking pins, dogs or pawls for the actuators that are operative in both directions of their swing without the usual accompaniment of lost motion at the initial forward and return movement of the actuator, thus rendering the full-stroke devices practically instantaneous with the initial movement of the actuator in either direction by the keys.

Other features and advantages will hereinafter appear.

In the accompanying drawings,

Figure 1 is a perspective view of the master-gear train and the connections to a numeral-key.

Figure 2 is a vertical section, showing detailed construction of the master-gear-locking mechanism.

Figure 3 is a perspective view, showing mechanism omitted from Figure 1.

Figure 4 is a plan view of the mechanism directly in train with the master gear, the master-gear clutch and the split means to remove the spirality from the carrying gears.

Figure 5 is an end elevation of Figure 4, the parts in section being taken at the line 5 of Figure 4.

Figure 6 is a detail of construction in perspective.

Figure 7 is a perspective operational view of the interlocking features of the full-stroke devices as when a second key is depressed before a first key has been fully restored.

Figure 8 is a diagrammatic view, showing the type-bar action in a semi-operated state and the master-gear-locking and register-aligning mechanisms about to be operated by the further depression of the key.

Figure 9 is an enlarged view, showing the master-gear-locking mechanism in premature co-operation with the notched disk thereof.

Figure 10 is a reduced vertical section through the actuator and the totalizer while in semi-operation.

Figure 11 is an enlarged section, showing the construction of a flexible full-stroke locking pin.

Figures 12 and 13 are diagrammatic views of the full-stroke pins in working operation against an actuator and a second actuator checked by the pins.

Figure 14 is a view similar to Figure 10, with the parts further advanced by the depressed key, and one aligning bar about to enter a wheel-aligning position after the locking of the master gear.

Figure 15 is a front vertical section through the totalizer.

Figure 16 shows the master gear locked from the position shown in Figure 9.

Figure 17 shows the parts of Figure 15, with the wheel-aligning bar in operative position for the wheels of lowest denomination and the second aligning bar about to be operated.

Figures 18, 19 and 20 are views similar to Figure 10, showing progressive operation of the parts from the Figure 10 partial depression of the key to the full depression of the same key.

The Underwood typewriting machine includes a keyboard having numeral-keys 25 that operate key-levers 26, fulcrumed at 27 and operable to vibrate bell-cranks 28 to swing type-bars 29 upwardly and rearwardly to strike the point of a platen 30, journaled for rotation between carriage-ends 31 of a carriage 32 formed with spaced-apart lugs 33 taking bearing upon a stationary rail 34 and also having a front center roll 35 to bear on a front rail 36. The printing mechanism is restored by a spring 37 that normally holds a stop-lug 38 under tension against a cross-bar 39. The carriage may have the usual carriage-feeding mechanism (not shown) operated by the printing stroke of a type-bar.

The computing mechanism may be divided into two mechanisms, a totalizer-mechanism secured to the traveling carriage and an actuating mechanism secured to the frame that translates the depression of the numeral-keys into digital values to be entered into the totalizers.

The totalizer-mechanism includes a truck 40 supported and suspended from arms 41 secured to the carriage 32. The truck may removably and adjustably support a plurality of totalizers 42 in the usual manner.

The actuator-mechanism includes a frame 43 secured to the machine over the keyboard and under the totalizer-mechanism. The frame 43 provides an anti-friction ball-raceway 44 to cooperate with a companion raceway in a rail 45 of the truck. To further support the overhang of the totalizers, each totalizer may have a roller 46 bearing upon a rail 47 at the front of the actuator-frame. The actuator-frame 43 supports a stationary rod 48, upon which are mounted a series of actuators 49 spaced apart thereon by arms 50 of the actuator having a sliding fit within slots 51 in the frame.

Each actuator has a spring 52 tensioned to normally hold a stop-face 53 against the frame, and further has a pivotal connection 54 with an actuating link 55 connected to a key-lever 26 at 56. Each actuator 49 is also formed with a cam-slot 57 to engage a stud 58 of a crank-arm 59 permanently secured to a rock-shaft 60. The cam-slot of each actuator varies in eccentricity, and from a uniform swing of the actuators by the numeral-keys, motion will be conveyed to the shaft 60 that progressively varies in rotative scope according to the 1 to 9 computative value of the numeral-key depressed.

Secured to the shaft 60 is a crank-arm 61, having a long stud 62, Figure 1, upon which is slidably mounted a link 63, having its free end permanently pivoted to a gear-sector 64 that normally is in train with a pinion 65 loose upon a shaft 66 and formed with a clutch-member 67.

To co-operate with the rotating clutch-member 67, a companion clutch-member 68 may include a head 69 joined thereto by a sleeve 70 to form a unit slidable along the shaft 66. The head 69 may be formed with tongues 71 slidable within grooves 72 in a flange 73 forming a part of a master gear 74 fixed to the shaft 66. With this construction, the clutch 68 may be moved along the shaft 66 to interlock with the member 67 driven by the sector 64, the tongues 71 will still engage the grooves 72 and the master gear will be rotated until the clutch 68 is withdrawn to release the master gear near the end of the down stroke of the key as will appear.

Each actuator 49, Figure 3, has a tongue or shoe 75 secured thereto and operable to engage pointed square check pins or dogs 76 projecting from a rock-shaft 77 at intervals to align with each shoe. The initial downward swing of an actuator 49 engages its pin 76 to rock the shaft 77, to rock and raise an arm 78, Figure 1, secured thereto.

The free end of said arm 78 carries a lifter 79 connected to one arm 80 of a bell-crank 81 having a stud 82 operable to slide the clutch-member 68 and the head 69 along the shaft 66 to interlock the master gear 74 with the pinion 65 before the sector 64 is rotated. Just in advance of the full down stroke of the key, the pin 76 will snap off the end of the shoe 75 and the clutch-interlock will be withdrawn, the master gear 74 freed from the pinion 65 to allow the pinion 65 and sector 64 to idly return to normal position upon the release of the depressed key.

Each actuator has peripheral V-teeth operable to be engaged by pawls or check pins 83 on a shaft 84 to force a completion of the actuator-stroke, in a well-known manner.

Each link 55 connecting the keys 25 with the actuator 49 has a mutilated edge formation operable to pass the link between two adjoining floating pins 85 arranged in longitudinal end-to-end series in the bar 39 to prevent the joint depression of two numeral-keys as shown in detail in Figure 1. Each link 55 also has an edge formation to engage a universal blade, bar or plate 86 secured to a rock-shaft 87, the relation of the parts being to depress the blade during the last part of the depression of the link or after the rotation of the master gear by an actuator.

The shaft 77 carries an arm 88, Figures 5 and 20, provided with a roll 89 operative to roll over a cam-face 90 of a lever 91 held against the roll by a spring 92, formed with a tooth 93 to interlock with the teeth of a rack 94 secured to the totalizer-truck 40 and formed with a second tooth 95 to normally interlock between two adjoining teeth of the master gear 74. The lever 91, fulcrumed at 96, operates to swing the tooth 93 into interlock with the rack 94 and swing the tooth 95 out of interlock with the master gear when the shaft 77 is rocked by the actuator.

The vibration of the lever 91 further vibrates a master dog 97 to operate in a well-known manner to vibrate seriatim a series of spring-pressed levers or arms 98 that support and control the carry-over devices of the totalizer 42.

The totalizer-mechanism includes generally the number-wheels 99, idler gears 100, carrying gears 101, star-wheels 102, and carry-over or transferring pinions 103.

The description up to this point may be the same or substantially the same as that disclosed in my pending application, No. 286,218, filed June 18, 1928.

One improvement includes a simplified manner of locking up the master gear 74 immediately after its digital rotation by the sector 64 and just before the opening of the clutch-members 67 and 68, to check any overthrow of the parts and also to prematurely hold the parts in alignment. To this end, the blade 86 has an ear 104, Figure 1, on the upper face to support a shouldered screw 105. This screw passes through a plain hole in the ear and is provided with a nut 106 having an eccentric for a bearing 107. The nut may be turned to adjust the eccentric and the screw set therein to bind the adjusted eccentric to the face of the ear 104 for a pivotal bearing to support the lower end of a link 108 held seated upon the bearing by a spring 108a tensioned between an ear on the link and an ear on the blade 86.

The free end of the link 108 has a pivotal connection with one end of a lever 109 pivoted at 110 to the actuator-frame and having a hole at the free end thereof to receive the free end of a pin 111 projecting from the lower end of a vertical slide 112. The lever 109 and the slide 112 may be arranged upon opposite sides of a frame-partition 113 with the pin 111 passing through a clearance hole 113a therein. To guide the slide 112 perpendicularly, a pair of rollers 114 are mounted upon suitable studs projecting from the partition 113 with the slide rolling between them, and the free end of the lever 109 may be guided by the large head of a screw 109a.

The upper free end of the slide 112 has one or more teeth 115, and to co-operate therewith the master gear 74 has secured to the side thereof a disk 116 having peripheral notches 117 to receive the teeth 115 of the slide 112. It will be noted that the teeth 115 have sharp square corners and fit snugly within the notches 117.

With the parts connected as described and normally positioned as at Figure 1, the link 55 depressed by its key-lever 26 operates its actuator 49 to rotate the master gear 74, the parts assuming the positions of Figure 8, with the type-bar still in motion to strike the platen, the link 55 is about to vibrate the blade 86 to lift the slide 112, and the master gear is near the end of its rotation. The further depression of the link 55 to the end of the key-stroke operates to rock the shaft 87, pull upon the flexed link 108, to vibrate the lever 109, to lift the slide 112 and throw the teeth 115 against the teeth of the master-gear disk 116. As the gear 74 is about to complete its rotation, the teeth 115 will clash with the teeth of the disk 116 as shown at Figure 9, and this checking of the full lifting movement of the slide 112 flexes the spring 108a and the bearing 107 will idly shift within the elongated slot 118 as shown at Figure 10. When the master gear 74 completes its digital rotation, in the direction of the arrow of Figure 9, the teeth of the disk 116 will rotate slightly and release the tensioned teeth 115 of the slide 112 to interlock with the disk 116 and arrest any overthrowing forces that may exist in the rotating master gear and in the associated train of gears in the totalizer.

From this description, it follows that at the end of the key-stroke the type-impression has been made, the master gear rotated and released from the key-driven sector, the master-gear disk 116 locked by the teeth 115 and the master gear also locked by the tooth 95 of the lever 91 under the tension of the spring 92. The release of the depressed key withdraws the teeth 115 from the disk 116, but the master gear is still held locked by the tooth 95.

In my said pending application No. 286,218, means were provided for realigning the series of carrying gears 101 after each actuation by the master gear by the use of a floating bar having an elongated tooth formed to cam the adjacent teeth of each wheel of the series into correct alignment, beginning with the wheels of lowest denomination. This alignment of the whole series of carrying gears by a single camming blade to first engage the wheel of lower denomination and progressively climb to the higher wheels has been improved to include a plurality of aligning bars, each bar operating independently of the other and relatively timed so that one bar operates to align half the wheels, and the other bar immediately following up the movement of the first bar to align the remaining wheels of the series.

The blade 86 may have a second ear 119 to support a shouldered screw 120 clamped in position by a nut, the shouldered section under the head of the screw including an eccentric 121 for adjusting the lower end of a link 122 formed with an open slot 122a at the free end thereof to receive a shouldered stud 123 to guide the upper end of the link for a vertical movement. The stud is stationary with a bracket 124 on the frame 43, and, as shown in Figure 5, the stud normally seats in the slot 122a without looseness by the adjustment of the eccentric 121. One side edge of the link 122 may be formed with a cam-face 125 operable to engage and cam a roller 126 mounted on one arm of a bell-crank lever 127 pivoted upon a stud 128 fast with the bracket 124. The forward free end of the lever 127 supports a pivot-stud 129 giving a bearing to the lower end of a vertical arm 130 pivotally connected at 131 to a lever 132 pivoted to and horizontally disposed along the face of the carriage-rail 47. The crank 127, arm 130 and lever 132 are under the control of a spring 133 tensioned to normally hold the lever 132 against a stop-pin 134 on the frame, to maintain an open space between the cam-face 125 and the roller 126 to provide for the adjustment of the lever 132 without cramping the roller against its operating cam 125.

The lever 132 at the free end has a rectangular hole to receive a tongue 135 formed in the free end of an arm 136 swinging from a screw 137 threaded into the fulcrum 96 supported by the bracket 113 on the frame. The arm 136 has a short blade, cam-bar or aligning bar 139 bent at right angles thereto with the upper edge beveled both ways to form a long V-shaped tooth positioned to swingably force itself between two adjoining teeth of the carrying gears 101 when the lever 132 is lifted by the blade 86. It will be noted that this cam-bar 139, as shown at Figures 3 and 17, has a length to engage two or more gears 101 beginning with the "tenths" carrying gear; and that the depression of the cam 125 vibrates the roller 126 to lift the bar 139 into engagement with the gears and then locks the bar by the roller 126 passing upon the dwell face 125a until the release of the depressed numeral-key.

The cam-bar 139 operates to engage the right-hand carrying gears 101 (Figure 17) of the series, immediately after the arrest of the master gear 74 by the teeth 115. The dwell provides for any excess of key-movement of the link 122. To align the teeth of the remaining gears 101 or those of highest denominations, a second cam-bar 140 may be aligned with the bar 139 to engage these gears. Preferably the two cam-bars 139 and 140 do not operate simultaneously, but the operation of the bar 140 is delayed until the bar 139 has practically interlocked with the gears 101 of lowest denomination.

To this end, the bar 140 is carried by a separate arm 141 swingable about a separate pivot 142, and having a separate connection with the link 122 to operate independently of the cam-face 125 as follows: The arm 141 may be provided with a perforated ear 143 through which a pull rod 144 is loosely arranged with a head 145 bearing upon the ear. The rod 144 passes downward, where the threaded free end engages a nut 146 formed with a closed-in slot 147 to receive a pin 148 projecting from the link 122. The arm 141 is provided with a spring 149 operative to normally swing a stop-pin 150 thereon into contact with a pin 151 set in the frame. The rod may be adjusted so that the slot 147 will rest upon the pin 148 without tension and without looseness.

Hence the drawing down of the link 122 by the blade 86, will not raise the cam-bar 140 until the pin 148 is first moved to the bottom of the slot 147 (see Figure 19), to pick up the nut 146 and then convey motion to the rod 144 which in turn operates cam-bar 140 to align the gears 101 of higher denomination.

To restore certain of the parts to normal positions after the release of a numeral-key, a spring 152 is tensioned between the pin 148 on the link 122 and a pin 124ª on the bracket 124, the reaction of the spring being checked by the slot 122ª engaging against the stud 123. In this way there are two strung-up trains of mechanism separated by an idle working space in the slot 147.

For purposes of convenience in assembling, the pivot 142 for the arm 141 is a short shaft-section (see Figure 4), insertible through a bracket 153 fast to the frame, through a shiftable pinion 154, and into an end bracket 155. To prevent end motion of the assembled shaft 142, an open hook 156 is pivoted upon the outer side of the bracket 153 to hook behind a shoulder on the shaft, and the lever or arm 141 with its long bearing-hub 157 adjusted on the projecting end of the shaft and held thereon for rotation by a suitable nut 158.

The totalizer-mechanism may be the same or substantially the same as shown in my pending application referred to, where the actuation of the master dog 97 operates the levers 98 seriatim as the totalizer moves letter-space distances through the computing zone. The raising of any lever 98 operates a universal locking bar 158ª to swing over and lock the other levers 98 of the series while the master gear is transmitting digital rotation to one gear 101.

In the present instance, the universal bar 158ª becomes operable to unlock or unlatch the series of numeral-wheels while the totalizer is in the computing zone.

It is an advantage to lock the registering mechanism when the totalizer is not in a computing zone or when removed from the machine. One effective way is to lock some member of the train intermediate the wheels 99 and the gears 101, such as the series of idler gears 100. To this end, structural features of the standard totalizer-casing are used with little changes, except to mill away the central portion of a cross-bar 159 to house a plate 160 hung upon trunnion-screws 161 threaded through the side walls of the casing for pivots to support each end of the plate. The plate 160 (see Figures 14 and 15) may have its free longitudinal edge bent over at right angles to form a depending tooth 160ª engageable with all the gears 100 to normally lock the gears against rotation. The plate 160 may have an arm 162, riveted to the under face thereof to pass through a slot 163 in the plate and rise at right angles to the plate to be engaged by the bar 158ª. The normal position of these parts is shown in Figure 20, and when the master dog 97 vibrates any lever 98 to the position of Figure 14, the other levers 98 of the series are locked and the plate 160 has been rocked against a stop 164 to free the gears 100 and their associated trains of gears. To control the plate 160, a backing pin 165 may be attached to the under side of the bar 158ª to depend therefrom and hold the end of the arm 162 against the bar 158ª for a positive movement therebetween. The pin 165 in normal position holds the plate 160 in interlock with the gears 100 by forcing the beveled tooth 160ª thereof between two adjoining teeth of the gears 100 and forcibly removes any spirality that may remain in the numeral-wheels, and the wheels will be held in perfect alignment.

Each actuator 49 (Figures 12 and 13) has a dwell slot 166 to provide for the swinging of the actuator after it has ceased to vibrate the arms 59 to convey rotation to the sector 64 and the master gear 74. The locking of the master-gear disk 116 by the slide 112 provides an aligning operation of the actuated carrying gear 101; the lifting of the cam-bar 139 into interlock with the gears 101 of lowest denominations performs a second alignment; the subsequent lifting of the cam-bar 140 into interlock with the gears 101 of higher denomination performs a third aligning operation; and upon the release of the master dog the restored tooth 160ª in the totalizer engages the whole series of gears 100 for a final alignment of the gear-trains, all during the down stroke of a numeral-key.

In this manner, each key operates separate mechanisms that co-operate at three different intervals to realign the disturbed trains of totalizer-gears, and then releases a final numeral-wheel aligner to correct any slight variation of the first three operations due to working clearance or looseness in the trains of gears intermediate the numeral-wheels and the carrying gears 101; the trains being approximately aligned and then finally or critically aligned at a point very close to the numeral-wheels at the end of each key-stroke and while the master gears and the carrying gears are held by their aligning means until the depressed key is released.

In my said pending application, Serial No. 286,218, the rock-shaft 84 is provided with a series of pins or dogs 83 permanently fixed to the shaft, each pin being in alignment with the toothed edge of an actuator 49. A full-stroke device of this character requires a slight down movement of the numeral-key before the pins become effective and interlock with the actuator, and also a slight return movement of the key before the full stroke is effective.

The free actuation of the key while the pins are being swung into operation from a central position sometimes gives trouble when a second key is depressed before the first key is fully restored, due to this loss of motion between the keys and the full-stroke mechanism. By slightly changing the shaft 84 and its pins 83, and without changing the swinging feature of the shaft from a position of horizontal spring-equipoise to a dragging inclination over the actuator, it was thought the loss of control from a defective full-stroke mechanism at the end of the returning key-stroke could be reduced, if not wholly eliminated.

To these ends, as shown particularly in Figures 11, 12 and 13, the pins 83, instead of being permanently secured to the shaft 84, are provided with a limited swinging movement independently of the shaft 84. The pins 83 may be formed from square stock, tapered on two sides at 167 (Figure 11) to a sharp point and shouldered down at the other end to form a round shank 168 threaded at the free end. The shaft 84 may be flattened at 169 for each pin-position, drilled through at 170 and counterbored at the opposite side of the shaft to provide a housing with tapering walls 171. The pin seats upon the flattened face of the shaft, with the shank 168 passing through the hole 170, a washer 172 slipped over the shank to bear against the face of the counterbore 171, a compression spring 173 set over the shank to rest upon the washer and a nut 174 threaded upon the shank 168. The nut 174 may be reduced at 175 to pass within the spring, and when the spring 173 is compressed between the nut 174 and the washer 172, the pin is self-centering upon the shaft 84 at right angles thereto under a light spring tension. The tension of the spring 173 may be sufficient to restore the pin to the normal position of Figure 11, or permit the pin 83 to be vibrated up or down a limited degree by an actuator 49.

With the two shafts 77 and 84 in the positions of Figure 1, the key may be partially depressed to the Figure 8 position, where the type-bar has been raised, the totalizer locked, the carry-over mechanism lifted, the gears 101 rotated, the blade 86 about to be vibrated by the link 55, and the adjoining keys locked by the displacement of the rods 85. A further depression of the link 55 brings the parts to the Figure 10 positions where rotation has been conveyed to the master gear, and the slide 112 lifted to the Figure 9 position. A slight further depression of the link 55 to the Figures 14 and 18 positions has completed the rotation of the master gear and its interlocking disk 116 as shown at Figure 16, and the first tooth 139 is about to align the gears 101 of lowest denominations. The further depression of the link 55 conditions the parts as shown in Figure 19, where the cam-bar 139 has finished the alignment of its group of gears 101 of the lowest denominations, and the cam-bar 140 is about to align the gears 101 of higher denominations and the pins 76 and 83 are about to be released by the actuator 49.

The final depression of the key places the parts as at Figure 20, where a pin 76 has been released by the actuator to release the shaft 77, to release the lever 91, to release the tooth 93, to release the totalizer-rack 94, to release the tooth 95 to re-engage the already locked master gear, to release the master dog 97, to release the lever 98, to restore the carry-over pinion 103 and release the plate 160 for a final realignment of the gears 100. The Figure 16 interlock is maintained, and the two cam-bars 139 and 140 are retained in interlock with the gears 101.

The release of the key from the Figure 20 position releases the blade 86, the slide 112 is withdrawn from the disk 116, the two bars 139 and 140 are withdrawn from the gears 101, and the restoring actuator idly picks up a pin 76 and a pin 83 for a return full-stroke control of the actuator.

Near the end of the restored key-stroke, the parts may assume the positions of Figure 7, where the pin 83 has snapped off the end tooth of the actuator to assume a central position by its spring 173, to rest upon the pin 76 of the shaft 77, which has not left the control of the shoe 75 of the returning actuator. If, by any chance, a second key were depressed while one actuator is still under the Figure 7 control, a second shoe 75$^a$ may pass under its companion pin 76$^a$, but the teeth of its actuator 49$^a$ will be checked by the pin 83$^a$ engaging the unrestored pin 76$^a$, and the depression of the second key is arrested thereby after the returning key is released by the key-locking pins 85.

It will be understood that the full depression of any numeral-key holds the aligning bars 139 and 140 in interlock with the gears 101 until the key is released, and that the fully depressed key releases its pin or dog 76, to release the tensioned shaft 77, lever 91 and arm 98, and the transfer pinion 103 and the plate 160 are restored by a snappy movement that transmits a blow or shock to the trains of gears held stationary at one end of the trains by the cam-bars 139 and 140. These shocks are especially effective by jarring the parts into alignment after an extensive carry-over in the series of trains.

In this manner means are provided to practically eliminate the idle interval at both the initial down and return stroke of the keys, where the keys are not under the control of the full-stroke elements to render the manipulation of the numeral-keys fool-proof. The wedging of the actuator 49$^a$ against the pin 83$^a$ (Figure 7) is effective until the shoe 75 of the returning actuator 49 is fully complete and the pin 76 releases the rock-shaft 77 to its position-centering spring.

The slight swinging movement of a second actuator 49 to the arrested position "a" of Figure 13 may partially rock its shaft-arm 59, but the rotation of the shaft 60 will be ineffective, because the open clutch-elements 67 and 68 are locked until the shaft 77 and its pins 76 are released and subsequently rocked into an angular position reverse to the position of Figure 7.

From the foregoing description, it is apparent that the new organization includes the repositioning of the two parallel rock-shafts 77 and 84 for a co-operation of the two series of pins 76 and 83 so that the return movement of the keys will vibrate the series of pins 76 to a position of abutment against the under side of the pins 83, and these pins 76 become stops to arrest the downward swing of any pin 83 by any actuator 49, until the shaft 77 and pins 76 are released by the restored key; that if the pins 83 were fixed to the shaft without individual movement, the pins would always assume the same linear plane, and it might be possible to depress a second key while the returning actuator was positioned as at Figure 12, and the second actuator might skitter under a pin 83 and tie up the machine, but when the pins 83 have an independent movement, one pin 83 may back-check the actuator as shown in full lines at Figure 12, and the remaining pins 83 of the series would normally assume the dotted position of Figure 12, and become wedged against the pins 76 to arrest any second actuator 49; that to prevent any skittering of a pin 83 over the teeth of the actuator if the actuator-direction were reversed before it had completed its stroke, the actuator-teeth may have wider and deeper teeth 177 at intervals as shown; that the pins 83 when blunted by wear, and become ineffective, may be instantly replaced without disturbing the other parts of a complicated mechanism; that for the purpose of timing the pins 76 and 83 for co-operation, the actuator may have a section 178 devoid of teeth; that the individual vibration of a flexible pin 83 having a light spring-tension removes the burden of key-rocking a stronger tensioned rock-shaft carrying a series of fixed pins; that the usual key-lock is effective during the greater part of the actuation of a key and the co-operation of the pins 76 and 83 supplement the key-locking means for a quicker and closer full-stroke control of the keys; and that while the shaft 84 is shown with a centering spring 176, the shaft might be stationary with the frame and the individual pins 83 wholly tensioned by their springs 173.

Variations may be resorted to within the scope of the invention, and portions of the improvements may be used without others.

Having thus described my invention, I claim:

1. In a computing machine, the combination with a traveling totalizer having a plurality of register-wheels, a denominational train of gears for each register-wheel, a relatively stationary master gear for driving the trains of gears seriatim, keys having means to differentially drive the master gear, and a master dog vibrated by each key to arrest the totalizer, of means carried by the totalizer operable to normally lock the train of gears against rotation, and means operable by the master dog to release the gear-trains from their locking means before the master gear is rotated by a key.

2. The combination of a detachable traveling totalizer including a series of gear wheels, an aligning bar carried by and detachable with said totalizer and normally engaging and aligning said series of wheels, key controlled actuating mechanism for said totalizer carried by the frame of the machine, and means operable by the actuation of a key of said actuating means when the totalizer is in the computing zone for disengaging the aligning bar from said wheels before rotation of any of the wheels can be effected.

3. The combination of a carriage, a totalizer mounted to travel with the carriage and including a series of gear wheels, key controlled actuating mechanism for said totalizer carried by the frame of the machine, aligning means carried by said totalizer and normally engaging a plurality of adjacent gear wheels therein for aligning them and removing any spiraling thereof that might occur, and automatically operating means controlled by each operation of said key controlled actuating mechanism when said totalizer is in the computing zone for releasing said aligning means from said wheels.

4. The combination of a carriage, a totalizer mounted to travel with the carriage and including a series of gear wheels, key controlled actuating mechanism for said totalizer carried by the frame of the machine, a shiftable aligning bar carried by said totalizer and operative on and normally engaging a plurality of said gear wheels for aligning them and removing any spiraling that might occur, and automatically operating means controlled by each operation of said key controlled actuating mechanism when the totalizer is in the computing zone for shifting said aligning bar out of engagement with said wheels.

5. The combination of a carriage, a totalizer mounted to travel with the carriage and including a series of gear wheels, key controlled actuating mechanism for said totalizer carried by the frame of the machine, an aligning bar pivotally carried by said totalizer and adapted to be brought into engagement with a plurality of said gear wheels to align them, means for normally maintaining said locking bar in engagement with said wheels, and automatically operating means controlled by each actuation of said key controlled actuating mechanism when the totalizer is in the computing zone for releasing said aligning bar from engagement with said wheels.

6. The combination of a detachable traveling totalizer including a series of gear wheels, aligning means carried by and detachable with said totalizer and operative on said series of gear wheels to align them and normally maintained in engagement therewith to hold them in alignment, key controlled actuating mechanism including a master dog actuated by each operation of a key of said mechanism, and means controlled by said master dog when the totalizer is in the computing zone for releasing said aligning means from said wheels.

7. The combination of a detachable traveling totalizer including a series of gear wheels, aligning means carried by and detachable with said totalizer and operative on said series of gear wheels to align them and normally maintained in engagement therewith to hold them in alignment, a locking bar carried by the totalizer and shiftable to and from locking position, operative actuating connections between said locking bar and said aligning means, key controlled actuating mechanism on the frame of the machine, and means controlled thereby when the totalizer is in the computing zone for actuating said locking bar upon each operation of a key.

8. The combination of a detachable traveling totalizer including a series of gear wheels, aligning means carried by and detachable with said totalizer and operative on said series of gear wheels to align them and normally maintained in engagement therewith to hold them in alignment, a locking bar carried by the totalizer and shiftable to and from locking position, operative actuating connections between said locking bar and said aligning means for disengaging the latter from said wheels when the locking bar is shifted to locking position, key controlled actuating mechanism including a master dog actuated by each operation of a key of said mechanism, and means controlled by each operation of said master dog when the totalizer is in a computing zone for shifting said locking bar to locking position and for releasing the aligning means from said wheels.

9. The combination of a detachable traveling totalizer including a series of gear wheels, aligning means carried by and detachable with said totalizer and operative on said series of gear wheels to align them and normally maintained in engagement therewith to hold them in alignment, said aligning means comprising an aligning bar pivoted directly on the frame of the totalizer, a lever carried by said totalizer and to which the aligning bar is connected, key controlled actuating means on the frame of the machine, and means controlled thereby when the totalizer is in the computing zone for actuating said lever upon each operation of a key.

10. The combination of a detachable traveling totalizer including a series of carrying wheels, a series of number wheels, and a series of intermediate gear wheels in mesh with said number wheels and said carrying wheels; aligning means pivotally carried by and detachable with said totalizer and operative on said intermediate gear wheels to align them, a controlling lever mounted to turn on an axis parallel with said series of carrying wheels and connected to said aligning bar; and key controlled actuating mechanism carried by the frame of the machine and including means operable upon each actuation of a key thereof when the totalizer is in the computing zone for moving said controlling lever.

11. The combination of a detachable traveling totalizer including a series of carrying wheels, a series of number wheels, a series of intermediate gear wheels in mesh with said number wheels and carrying wheels, a series of transfer-wheels, and a series of levers by which said transfer-wheels are carried; aligning means carried by and detachable with said totalizer and comprising an aligning bar cooperative with one series of said wheels to align them, and means controlled by an actuation of any one of said transfer-wheel carrying-levers for actuating said aligning bar; and key controlled actuating mechanism carried by the frame of the machine and including means for shifting one of said transfer-wheel carrying-levers upon each operation of a key of such mechanism when the totalizer is in the computing zone.

12. The combination of a detachable traveling totalizer including a series of carrying wheels, a series of number wheels, a series of intermediate gear wheels in mesh with said number wheels and carrying wheels, a series of transfer-wheels, a series of levers by which said transfer-wheels are carried, a shiftable locking bar adapted, when any one of said transfer-wheel carrying-levers is moved from normal position, to be moved into locking position relative to the remainder of said transfer-wheel carrying-levers, aligning means carried by and detachable with said totalizer and comprising an aligning bar cooperative with one series of said wheels to align them, operative connections between said locking and aligning bars for moving the aligning bar out of effective position when the locking bar is moved to effective position; and key controlled actuating mechanism including means operable on one of said transfer-wheel carrying-levers upon each actuation of a key when the totalizer is in the computing zone.

13. The combination of a detachable traveling totalizer including a series of carrying wheels, a series of number wheels, a series of intermediate gear wheels in mesh with said number wheels and carrying wheels, a series of transfer wheels, a series of levers by which said transfer wheels are carried, a shiftable locking bar adapted when any one of said transfer-wheel carrying-levers is moved from normal position, to be moved into locking position relative to the remainder of said transfer-wheel carrying-levers, aligning means carried by and detachable with said totalizer and comprising an aligning bar cooperative with one series of said wheels to align them, operative connections between said locking and aligning bars for moving the aligning bar out of effective position when the locking bar is moved to effective position; and key controlled actuating mechanism carried by the frame of the machine and including a master dog actuated by each operation of a key of said actuating mechanism, said master dog being operable on one or another of said transfer-wheel carrying-levers when the totalizer is in the computing zone and effecting a disengagement of the aligning bar preliminary to a rotation of any of the wheels in the totalizer.

14. In a computing machine, the combination with a series of register-wheels having a series of gears, of a master wheel therefor, differential mechanism to operate said master wheel, keys for driving the differential mechanism, a universal bar operable by the keys independently of said differential mechanism, and realigning means operated by any key through said universal bar and including successive aligning bars for the series of gears, separate connections being provided from said universal bar to said aligning bars, effective to operate the aligning bars seriatim, to align successive groups of the gears seriatim at each key-stroke to bring them into uniform alignment by the single depression of any numeral-key.

15. The combination of a detachable totalizer settable upon a mounting according to a computing zone, and including a denominational series of computing gears, an aligning bar common to said gears and movable into and out of engagement therewith, said aligning bar carried by and detachable with said totalizer, key-controlled actuating mechanism for said totalizer, said actuating mechanism and mounting being relatively movable to enable the actuating mechanism to engage with said gears seriatim in a computing zone, and means, responsive to the actuation of a key of said actuating mechanism, when the totalizer is operated at the computing zone, for causing the aligning bar to align said gears after each rotation of the latter by said actuating mechanism.

16. The combination of a detachable totalizer settable upon a mounting according to a computing zone, and including a denominational series of computing gears, an aligning bar common to said gears and movable into and out of engagement therewith, said aligning bar carried by and detachable with said totalizer, key-controlled actuating mechanism for said totalizer, said actuating mechanism and mounting being relatively movable to enable the actuating mechanism to engage with said gears seriatim in a computing zone, and means, responsive to the actuation of a key of said actuating mechanism, when the totalizer is operated at the computing zone, for causing the aligning bar to align said gears after each rotation of the latter by said actuating mechanism, means being provided whereby said aligning bar interlocks with said gears to guard the latter against rotation when the totalizer is detached.

OTTO THIEME.